United States Patent [19]

Walters

[11] E Re. 29,329

[45] Reissued Aug. 2, 1977

[54] HYDRAULIC SYSTEMS

[75] Inventor: Ronald Bernard Walters, Wembley, England

[73] Assignee: Sperry Rand Limited, London, England

[21] Appl. No.: 732,704

[22] Filed: Oct. 15, 1976

Related U.S. Patent Documents

Reissue of:

[64] Patent No.: 3,903,786
Issued: Sept. 9, 1975
Appl. No.: 467,082
Filed: May 6, 1974

[30] Foreign Application Priority Data

May 15, 1974 United Kingdom ..... 22950/74

[51] Int. Cl.[2] ..... F15B 11/08

[52] U.S. Cl. ..... 91/444; 91/461; 137/596

[58] Field of Search ..... 91/444, 443, 461; 137/596, 596.14

[56] References Cited

U.S. PATENT DOCUMENTS

| | | | |
|---|---|---|---|
| 2,909,195 | 10/1959 | Keyt | 91/433 X |
| 3,532,119 | 10/1970 | Lind | 137/596 |
| 3,555,970 | 1/1971 | Borgeson | 91/461 |
| 3,854,382 | 12/1974 | Walters | 91/461 |

*Primary Examiner*—Edgar W. Geoghegan
*Attorney, Agent, or Firm*—Barnes, Kisselle, Raisch & Choate

[57] ABSTRACT

A hydraulic system including a compensator connected between the service ports of the control valve and the load and arranged to restrict the flow in one or both of the service lines so as to maintain a constant pressure difference between the supply pressure and the pressure at the valve service port supplying fluid to the load. The compensator may be connected in both service lines and arranged to restrict the flow equally in each of them. Alternatively a single-sided compensator may be used, and if the load is liable to over-run it must be connected in the service line which is downstream of the load when over-running.

4 Claims, 10 Drawing Figures

HYDRAULIC SYSTEMS

Matter enclosed in heavy brackets [ ] appears in the original patent but forms no part of this reissue specification; matter printed in italics indicates the additions made by reissue.

This invention relates to hydraulic systems in which a four-way control valve controls the supply of hydraulic power to move a load.

In such systems, the response to movements of the control valve depends on the magnitude of the load, and where the load may vary within wide limits the system may be difficult to control precisely and reliably. An object of the present invention is to reduce this difficulty.

In some cases the load may tend to overrun, causing cavitation in the supply lines, and the preferred form of this invention provides a means of preventing cavitation and enabling smooth control to be maintained with an over-running load.

In a system according to the present invention, a compensator is connected between the service ports of the control valve and the load, and is arranged to restrict the flow in one or both of the service lines so as to maintain a constant pressure difference between the supply pressure and the pressure at the valve service port supplying fluid to the load. The compensator may be connected in both service lines and arranged to restrict the flow equally in each of them. Alternatively a single-sided compensator may be used, and if the load is liable to over-run it must be connected in the service line which is downstream of the load when overrunning.

In a preferred form of the invention the control valve is a pilot-operated servo valve and the pilot pressure is applied to operate a shuttle valve so as to select the service line supplying fluid to the load and to apply the pressure in this line to the compensator. Where this is not convenient, pilot pressure for operating the shuttle valve may be obtained from a flow-sensing valve in one of the service lines.

In a preferred form of construction the compensator and the pilot operated shuttle valve are incorporated in a block provided with ports on its opposed flat surfaces corresponding to the ports of the control valve so that it can be assembled between the control valve and a surface having the supply and load connections without modification of the control valve.

When a number of systems according to the invention are connected together in an installation provided with a common power supply, shuttle valves may be connected across the load of each system to provide a load sensing supply for control of the supply pressure, for example, by controlling the off-load point of variable off-loading valve or the pressure compensator setting and hence the swash angle of a variable delivery swash plate pump.

The invention will be further described by way of example with reference to the accompanying drawings, in which.

Figure 4:
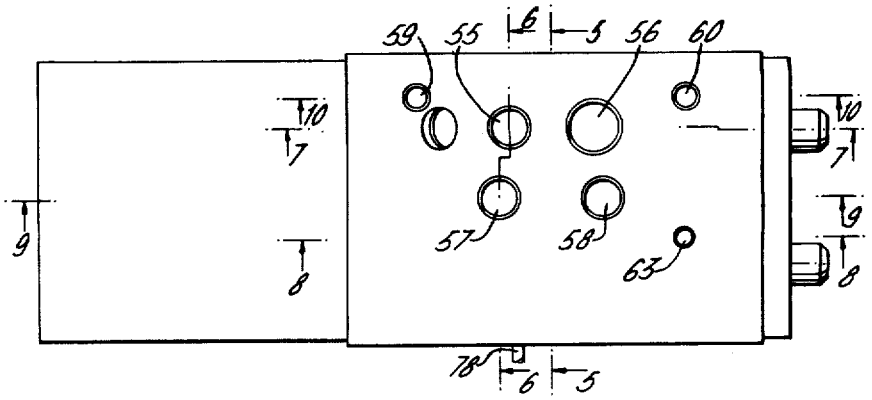
FIG. 4 is an elevation of the unit of FIG. 3.

FIGS. 5, 6, 7, 8, 9, and 10 are sections of the unit taken on the planes indicated in FIG. 4.

Figure 1:
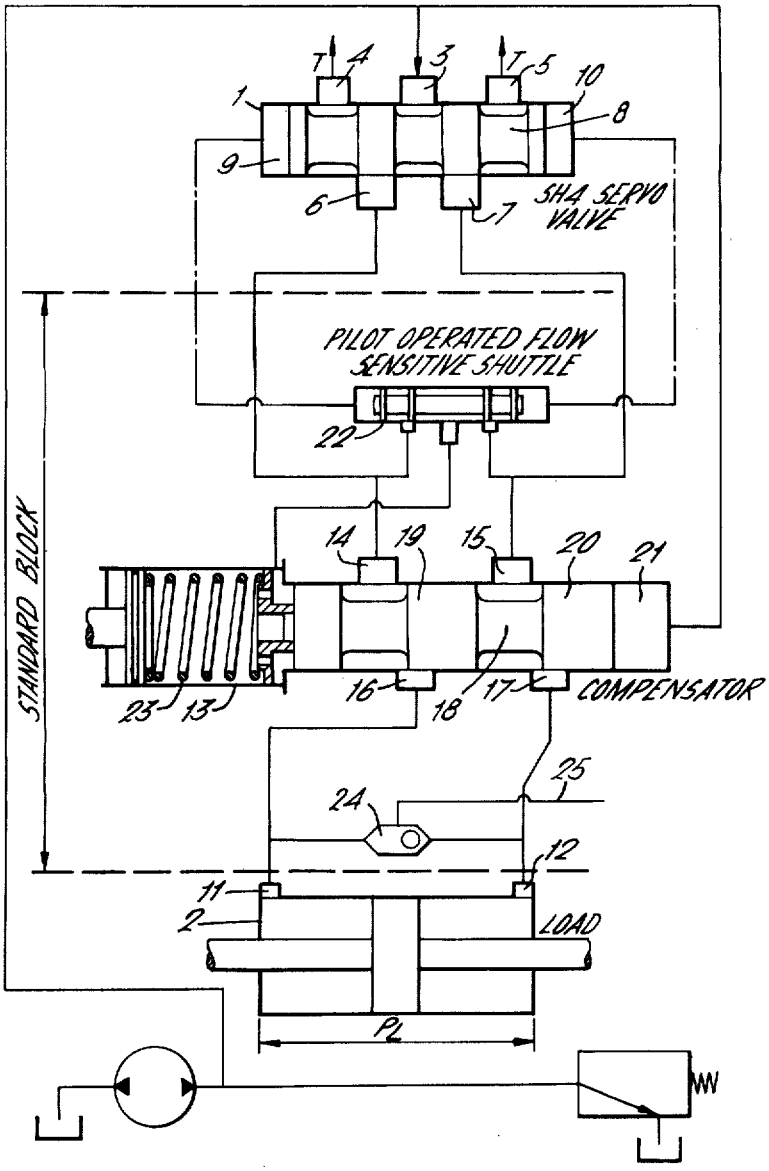
FIG. 1 is a circuit diagram of a system according to the invention.

Referring first to FIG. 1, a control valve 1 controls the supply of power to a load 2. In the FIGURE this load is shown as a ram, although it could, of course, be any other suitable form of actuator, for example a vane motor. The valve 1 is a four-way valve having the inlet 3 connected to the supply line, a pair of tank ports 4 and 5 exhausting to tank, and a pair of service ports 6 and 7 which by movement of the valve spool 8 are connected, one of them to the tank, and the other to the supply. The valve 1 is a pilot operated servo valve, the pilot stage of which is not shown in the drawing. A separate pilot valve may be used but in a convenient construction the pilot valve is contained within the main valve spool 8. In either case, the pilot pressure for operating the main valve spool appears across the end faces of the spool 8 at 9 and 10.

The supply from the service ports 6 and 7 is applied to ports 11, 12 of the load and according to the invention this is done by way of a compensator 13.

The compensator 13 is a spool valve having a pair of ports 14, 15 connected to the service ports 6, 7 of the servo valve and a pair of outlet ports 16, 17 connected to the ports 11, 12 of the load. The spool 18 of the compensator has a pair of raised lands 19, 20 arranged to co-operate with the ports 14, 15 so as to control the supply of hydraulic fluid into and out of the service ports 6 and 7 of the control valve. One end 21 of the compensator spool 18 is acted on by the supply pressure, the other end of the spool 18 is subjected to the pressure in one of the valve service lines from a shuttle valve 22, and also to the force of a biasing spring 23.

The shuttle valve 22 is a spool valve in which the ends of the spool are acted on by the pilot pressures operating at the ends 9 and 10, of the control valve, the spool moving under this pressure so as to connect the end space of the compensator to whichever of the service ports 6 and 7 is being connected by the control valve to the supply line.

In operation the spring 23 is set up so as to correspond to the pressure to be dropped across each opening of the control valve 1, this pressure being fairly low, for example 125 lbs. per sq. in. When the control valve is moved, for example to the left, in the view shown in the FIGURE, pilot pressure in the valve also operates the shuttle valve 22 connecting the service port 6 to the end space of the compensator 13 where it acts on the compensator spool 18 in addition to the force of the spring 23 so as to oppose the supply pressure applied to the other end 21 of the spool. When the load starts to move and if the pressure at the service port 6 falls, the supply pressure overcomes these combined pressures, moving the spool 18 to the left and causing the lands 19, 20 to close the ports 14, 15 so restricting the the flow of hydraulic fluid as to maintain pressure in the service port 6 at the predetermined drop of 125 lbs. per sq. in. below line pressure set by the spring 23. The rate of movement of the load is therefore set by the opening of a control valve 1 independently of the magnitude of the load at any moment.

Alternatively, if due to an opposing load the pressure at the service port 6 rises, the compensator spool moves to the right to maintain the pressure drop in the service line at 125 lbs. per sq. inch.

Should the load tend to over-run, the pressure in the service port 6 drops, causing the compensator to close, restricting the flow of hydraulic fluid in both service lines so as to maintain this pressure differential so that no cavitation occurs and the load moves under control of the valve 1.

If a number of systems of this kind are to be driven from a common supply whose pressure is controlled by load-sensing means, a ball shuttle valve 24 is connected across the load ports 11 and 12 and the pressure from this is carried through line 25 to the power unit of another system where it may be used to control the unloading point of an off-loading valve or the pressure compensator setting and therefore the swash angle of a variable delivery swash plate pump or other similar control device.

Figure 2:
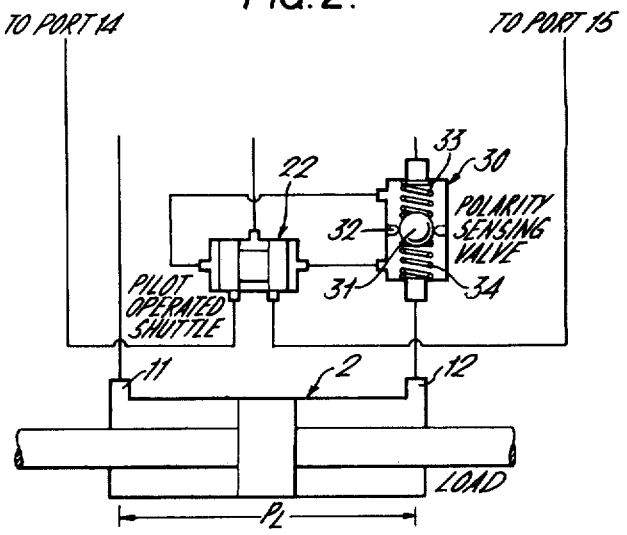
FIG. 2 shows a modification of the circuit of FIG. 1.

The arrangement described above with reference to FIG. 1 uses the pilot pressure of the main servo control valve for operating the shuttle valve. This may sometimes not be convenient; for example the main control valve may not be pilot operated. In such a case the invention may be carried out with the modification which will now be described with reference to FIG. 2.

Referring now to this FIGURE, in one of the service lines to the load 2 a flow polarity sensing valve 30 is inserted to provide the necessary pilot pressures to the shuttle valve 22. The polarity sensing valve 30 comprises a ball 31 which is a free fit in an aperture in a plate 32 and which is maintained central in this aperture by means of a pair of springs 33, 34. The pilot pressure for operating the shuttle valve 22 are taken from either side of the plate 32. In operation, any flow into or out of the port 12 of the load 2 has to pass through this valve and does so by displacing the ball 31 to one or other side of the position in which it closes the aperture in the plate 32 against the action of one of the springs 33, 34. A pressure drop is therefore generated across the valve 30 whose magnitude depends primarily on the stiffness of these springs, and this pressure drop is applied to the ends of the spool of the shuttle valve 22 which is arranged to transmit the pressure of the valve service line to the compensator 13 of FIG. 1.

In a common construction of a hydraulic control system the control valve is mounted directly on the power unit. In this case both the control valve and the power unit have matching surfaces machined flat in which are formed galleries for carrying the supply service and pilot control pressures between the valve and the power unit. These end at each matching surface in a matching system of galleries and either each opening in one of the surfaces is surrounded by an O-ring seal so that when the valve is bolted to the power unit the necessary connections are automatically made, or a separate sealing plate is provided.

In a preferred manner of carrying out the present invention the compensator and shuttle valve, and load-sensing shuttle if required, are mounted in a unit comprising a rectangular block having machined flat opposed surfaces provided with a corresponding system of passages so that it may be bolted directly between the control valve and the power unit to form a system according to the present invention. The block thus contains the portion within the dotted lines of FIG. 1.

Figure 3:
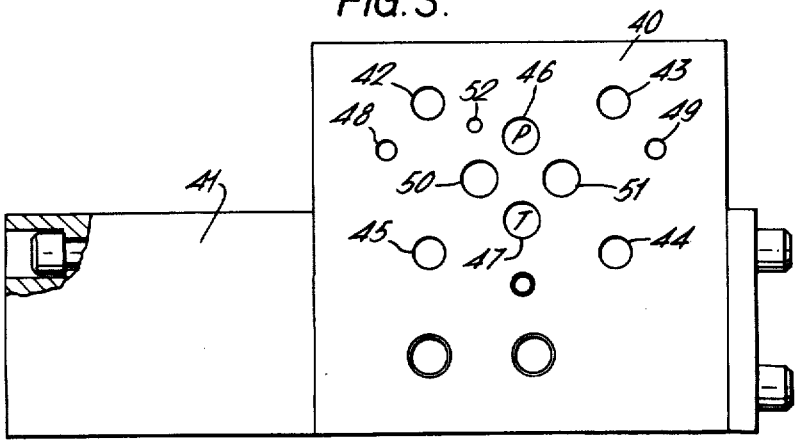
FIG. 3 is a plan view of a unit incorporating a compensator and shuttle valve connected in a circuit according to the invention.

FIG. 3 shows a unit of this kind in plan, and FIG. 4 shows the same unit in side elevation.

Referring first to FIG. 3, the unit comprises a rectangular block 40 of which the top face (visible in the FIGURE) and the parallel bottom face are machined flat and provided with corresponding openings. A projection from the block 41 forms a housing for the compensator spring of FIG. 1. The openings visible in the FIGURE comprise a set of four holes, 42, 43, 44, 45, which extend right through the unit and accommodate tie bolts by means of which the valve and the compensator unit are firmly secured to the power unit. A passageway 46 extends right through the unit and provides a connection for system pressure from the pump and a similar parallel passage 47 provides the connection to tank for the servo valve and compensator. Two smaller passages 48 and 49 allow pilot pressure to be transmitted from the servo control valve to the shuttle valve which is within the unit 40.

The openings 50 and 51 form part of the service line. These openings do not extend right through the unit but are drilled in for a short distance from each face. Cross drillings from the side of the unit provide the necessary connections on the valve side and the power unit side to the ports of the compensator. A locating hole 52 may be provided to assist in location during assembly.

FIG. 4 is a side elevation of the block 40 showing a number of drillings which form internal passageways for the interconnection to the compensator and shuttle valve located within the block. The outer ends of each of these drillings is sealed by a screwed plug.

Referring now to this FIGURE, the passageways 55 and 56 provide inlets from the servo valve service port to the compensator and 57 and 58 provide outlets from the compensator back through connections on the power unit to the load; 59 and 60 allow the pilot pressures from the passages 48 and 49 of FIG. 3 to the ends of the shuttle valve which is within the block 40. The drilling 63 is part of a system of connecting passages which apply system pressure to the end of the compensator spool remote from the spring. A locating pin 78 is provided to assist location during assembly.

Figure 5:
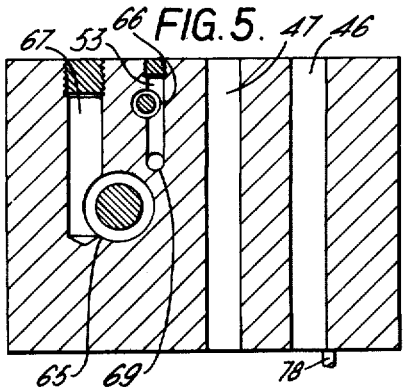
Figure 6:
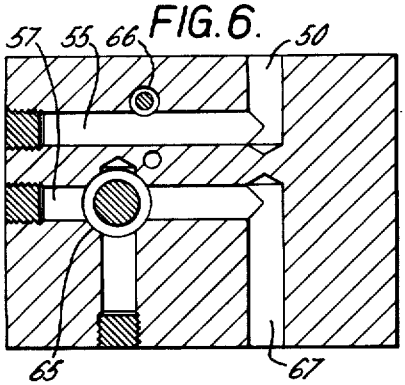

FIGS. 5 and 6 are cross-sections of the block 40 in the plane 5—5 and 6—6 respectively indicated in the FIG. 4. Referring now to those FIGURES, the compensator valve comprises a spool working within a bore 65. Similarly the shuttle valve comprises a spool working within a further bore 66.

The service line connection from the control valve 50 is only drilled a short distance into the block, where it meets the cross drilling 55. Further drillings not shown in FIG. 5 connect this to the appropriate position in the compensator bore so that it forms an inlet port for the compensator valve. The compensator outlet port is formed by the drilling 57 which communicates with the service line outlet 67. Drillings 55 and drilling 56 shown in FIG. 7 connect the service ports to the ports in the shuttle valve bore. The pressure line 46 and the tank line 47 are drilled straight through the block 40. A connection exists between the pressure line and one end of the compensator, but this is not visible in the section of FIG. 5. A drilling 53 passes through the shuttle valve bore 66 to make connection with a passageway 69 conveying the pressure selected by the shuttle valve to the spring end of the compensator.

FIGS. 7, 8, 9, and 10 are sections of the unit on the planes indicated in FIG. 4. These sections show the compensator and shuttle valve and the various internal passages by which they are interconnected.

Figure 7:
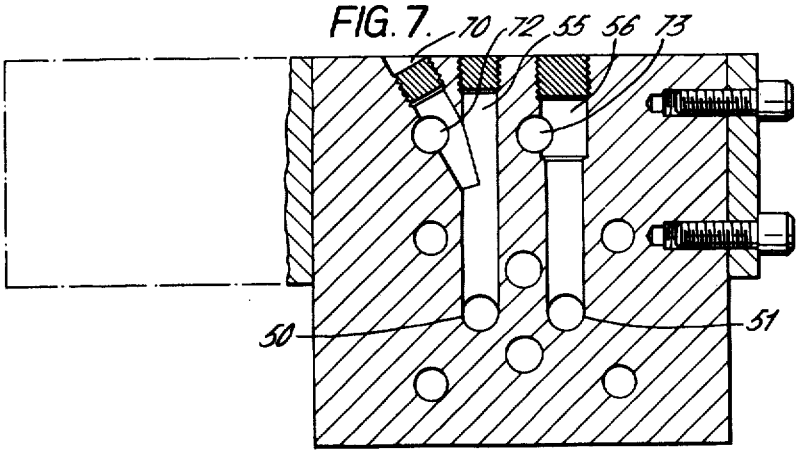

Referring first to FIG. 7, the service line connections from the valve 50, 51 are connected by passageways 55 and 56, and the cross drilling 70 to passages 72 and 73 which provide the inlet ports of the compensator valve. This valve will be shown more fully in FIG. 9.

Figure 8:
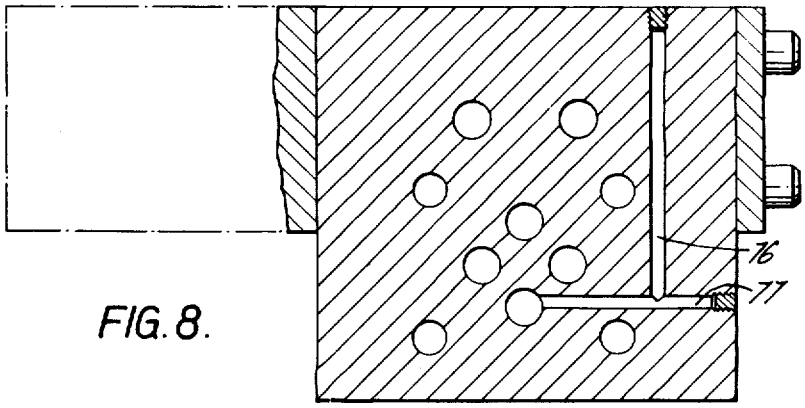

FIG. 8 is a section taken in the plane of two of the passageways 76, 77 by means of which the supply pressure is transmitted to the end of the compensator spool opposite to the spring.

Figure 9:
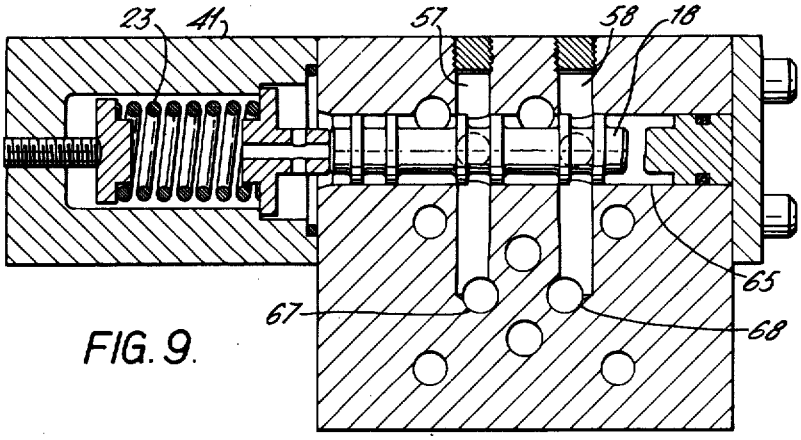

The section of FIG. 9 is taken through the axis of the compensator spool 18. One end of the spool is acted on by the bias spring 23 contained in the housing 41. The other end of the spool is subject to system pressure from the pressure line 46 by way of the passages 76 and 77 shown in FIG. 8. The service lines 67, 68 which supply the load communicate with the passages 57, 58 which pass through the valve bore 65 to form the outlet ports of the compensator. The spring housing 41 is also connected to the load pressure from the shuttle valve by means of a system of passages, a part of which 53, 69 appears in FIG. 5.

Figure 10:
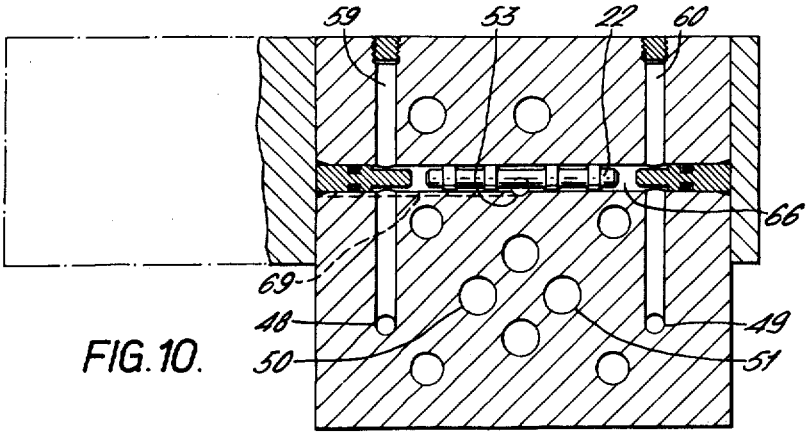

FIG. 10 is a section taken in a plane which includes the axis of the shuttle valve.

The shuttle valve spool 22 works in the bore 66 and is acted on at either end by pilot pressures from the pilot pressure lines 48 and 49 which are conveyed to the ends of the shuttle valve spool by means of the passages 59 and 60. The service lines from the control valve communicate with the passages 55 and 56 (not shown in FIG. 10) which break through the bore 66 and so provide ports for the selection of the required service line pressure as determined by the pilot pressures. The output from the shuttle valve is applied through the passages 53 and 69, (see also FIG. 5) to the spring end of the compensator.

The above arrangement may be simplified by using a compensator with a single land metering the flow in only one of the service lines. If the load is liable to overrun the compensator should be in the line which is downstream of the load in the over-running condition.

The unit as described above does not include any connection for a load-sensing line. If this is required it may be provided by the inclusion of a ball shuttle valve connected to the lines 67, 68 so as to respond to the higher of the pressures in the two lines.

Seals will of course be required at the surfaces of the unit around each of the bores to prevent the escape of fluid, and these have been omitted for clarity.

I claim:

[1. A hydraulic system including a source of hydraulic pressure, a load, a four-way control valve arranged to control the supply of hydraulic pressure to said load, said valve having a pair of service ports, a pair of service lines connecting said service ports to said load, a compensator being connected in at least one of said service lines and being arranged to restrict the flow of hydraulic fluid in said service line so as to maintain a constant pressure difference between said source pressure and said pressure at that one of the valve service ports that supplies fluid to said load.]

2. A hydraulic system [according to claim 1 in which the compensator is connected in both service lines and is arranged to restrict flow equally in each of them] *including a source of hydraulic pressure, a load, a four-way control valve arranged to control the supply of hydraulic pressure to said load, said valve having a pair of service ports, a pair of service lines connecting said service ports to said load, a compensator being connected in at least one of said service lines and being arranged to restrict the flow of hydraulic fluid in said service line so as to maintain a constant pressure difference between said source pressure and said pressure at that one of the valve service ports that supplies fluid to said load,*

*said compensator being connected in both service lines and is arranged to restrict flow equally in each of them.*

3. A system according to claim 2 in which the control valve is a pilot-operated servo valve, and the pilot pressure is arranged to operate a shuttle valve so as to select the service line supplying fluid to the load, and to apply the pressure in that line to the compensator.

4. A system according to claim [1] *2* including a shuttle valve, a flow-sensing valve is included in one of the service lines to provide pilot pressures for operating said shuttle valve which selects the service line supplying fluid to the load, and to supply the pressure in this line to said compensator.

5. A compensator and pilot operated shuttle valve incorporated in a block provided with ports on opposed flat surfaces, constructed and arranged so that it can be assembled with a control valve to form a system according to claim [1] *2*.

* * * * *